US009701302B2

(12) United States Patent
Matsunaga et al.

(10) Patent No.: US 9,701,302 B2
(45) Date of Patent: Jul. 11, 2017

(54) ENERGY MANAGEMENT DEVICE FOR A VEHICLE HAVING A PLURALITY OF DIFFERENT ENERGY SOURCES

(71) Applicant: MITSUBISHI ELECTRIC CORPORATION, Chiyoda-ku, Tokyo (JP)

(72) Inventors: Takanori Matsunaga, Tokyo (JP); Hiroshi Fujioka, Tokyo (JP); Akinobu Sugiyama, Tokyo (JP); Kohei Mori, Tokyo (JP); Masataka Shirozono, Tokyo (JP); Nobutaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/476,289

(22) Filed: Sep. 3, 2014

(65) Prior Publication Data
US 2015/0134206 A1    May 14, 2015

(30) Foreign Application Priority Data

Nov. 8, 2013    (JP) ................................. 2013-231798

(51) Int. Cl.
*B60W 10/06*      (2006.01)
*B60W 10/08*      (2006.01)
(Continued)

(52) U.S. Cl.
CPC .......... *B60W 20/104* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 5,934,089 A | 8/1999 | Nakagawa et al. |
| 6,234,932 B1 * | 5/2001 | Kuroda .................... B60K 6/26 180/65.1 |

(Continued)

FOREIGN PATENT DOCUMENTS

| CN | 102951104 A | 3/2013 |
| DE | 10 2008 021 045 A1 | 10/2008 |

(Continued)

OTHER PUBLICATIONS

JP2005192319_Translation.pdf—Translation of JP 2005192319 obtained from the JPO on Jan. 21, 2016.*

(Continued)

*Primary Examiner* — Rami Khatib
*Assistant Examiner* — Jeffrey Boomer
(74) *Attorney, Agent, or Firm* — Sughrue Mion, PLLC; Richard C. Turner

(57) ABSTRACT

In a vehicle energy management device, a travel route calculator calculates a travel route of a vehicle, and an energy consumption-related information obtaining unit obtains energy consumption-related information along the travel route. An energy consumption amount computing unit calculates, based on the energy consumption-related information, an estimated value of an energy consumption amount by vehicle devices (required travel energy amount) when the vehicle travels along the travel route. A control plan preparing unit prepares a control plan for the vehicle devices based on the required travel energy amount. A feedback control unit performs feedback control of the vehicle devices to reduce a difference between the estimated value and an actual measured value of the energy consumption amount by the vehicle devices.

16 Claims, 5 Drawing Sheets

(51) Int. Cl.
  *G01C 21/34* (2006.01)
  *B60W 50/00* (2006.01)
  *B60W 20/00* (2016.01)
  *B60W 20/40* (2016.01)
  *B60W 20/12* (2016.01)

(52) U.S. Cl.
  CPC ............ *B60W 20/12* (2016.01); *B60W 20/40* (2013.01); *G01C 21/3469* (2013.01); *B60W 2050/0088* (2013.01); *B60W 2550/12* (2013.01); *B60W 2550/142* (2013.01); *B60W 2550/146* (2013.01); *B60W 2550/402* (2013.01); *B60W 2720/103* (2013.01); *Y02T 10/6286* (2013.01)

(56) References Cited

U.S. PATENT DOCUMENTS

| | | | |
|---|---|---|---|
| 2003/0015358 A1 | 1/2003 | Abe et al. | |
| 2003/0015874 A1 | 1/2003 | Abe et al. | |
| 2006/0005736 A1* | 1/2006 | Kumar | B60L 11/1801 105/1.4 |
| 2006/0048982 A1* | 3/2006 | Yamamoto | B60K 6/44 180/65.225 |
| 2009/0101421 A1 | 4/2009 | Oyobe et al. | |
| 2009/0319110 A1* | 12/2009 | Tani | B60K 6/48 701/22 |
| 2010/0179714 A1* | 7/2010 | Tani | B60K 6/445 701/22 |
| 2012/0011122 A1* | 1/2012 | Sakuma | G06F 17/30241 707/737 |
| 2012/0022744 A1* | 1/2012 | Endo | B60H 1/00392 701/36 |
| 2012/0316717 A1* | 12/2012 | Daum | B60L 11/1842 701/22 |
| 2013/0046428 A1* | 2/2013 | Jordan | B60L 1/06 701/22 |
| 2014/0046595 A1* | 2/2014 | Segawa | G01C 21/34 701/541 |
| 2014/0207363 A1* | 7/2014 | Kanno | G01C 21/3469 701/123 |
| 2015/0046000 A1* | 2/2015 | Zhao | B60K 6/445 701/22 |

FOREIGN PATENT DOCUMENTS

| | | | | |
|---|---|---|---|---|
| DE | 102010039653 A1 * | 2/2012 | ............ | B60L 11/126 |
| JP | 2001-183150 A | 7/2001 | | |
| JP | 2003-32803 A | 1/2003 | | |
| JP | 3386044 B2 | 3/2003 | | |
| JP | 3537810 B2 | 6/2004 | | |
| JP | 2004-248455 A | 9/2004 | | |
| JP | 2005192319 A * | 7/2005 | | |
| JP | 2006-335179 A | 12/2006 | | |
| JP | 2007-62638 A | 3/2007 | | |
| JP | 3894105 B2 | 3/2007 | | |
| JP | 2009-137340 A | 6/2009 | | |
| JP | 2012-18506 A | 1/2012 | | |
| WO | 2012/081104 A1 | 6/2012 | | |

OTHER PUBLICATIONS

DE102010039653A1_Translated.pdf. Translation of DE102010039653A1 obtained from EspaceNet on Jun. 16, 2016.*
Notification of Reason(s) for Refusal for Japanese Patent Application No. 2013-231798, dated Jul. 8, 2014.
Communication dated Aug. 5, 2016 from the State Intellectual Property Office of the P.R.C. in counterpart Chinese application No. 201410624451.2.
Communication dated Feb. 28, 2017, from the State Intellectual Property Office of the P.R.C., in counterpart Chinese application No. 201410624451.2.

* cited by examiner

F I G. 2
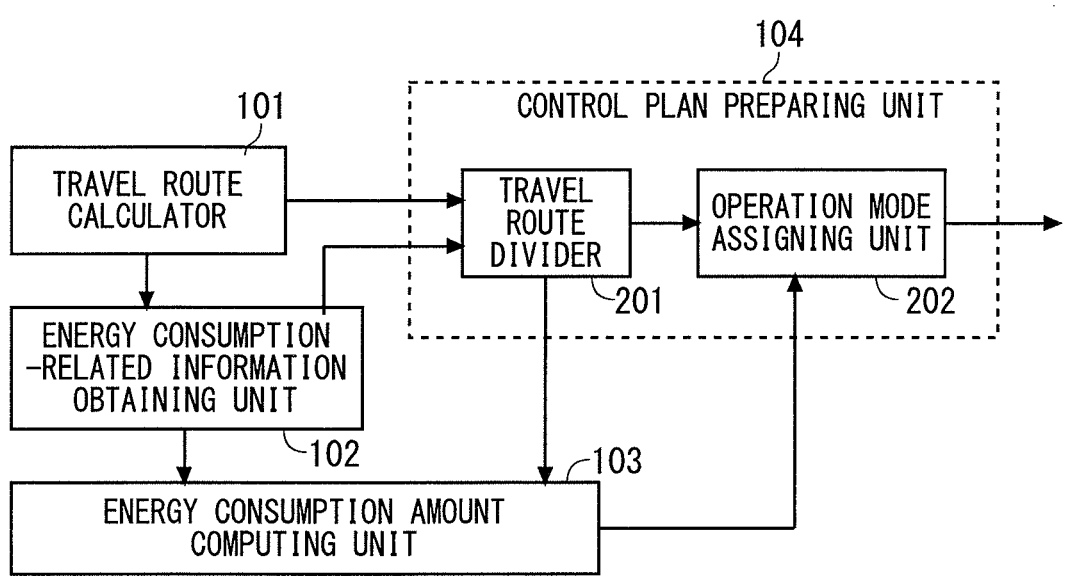

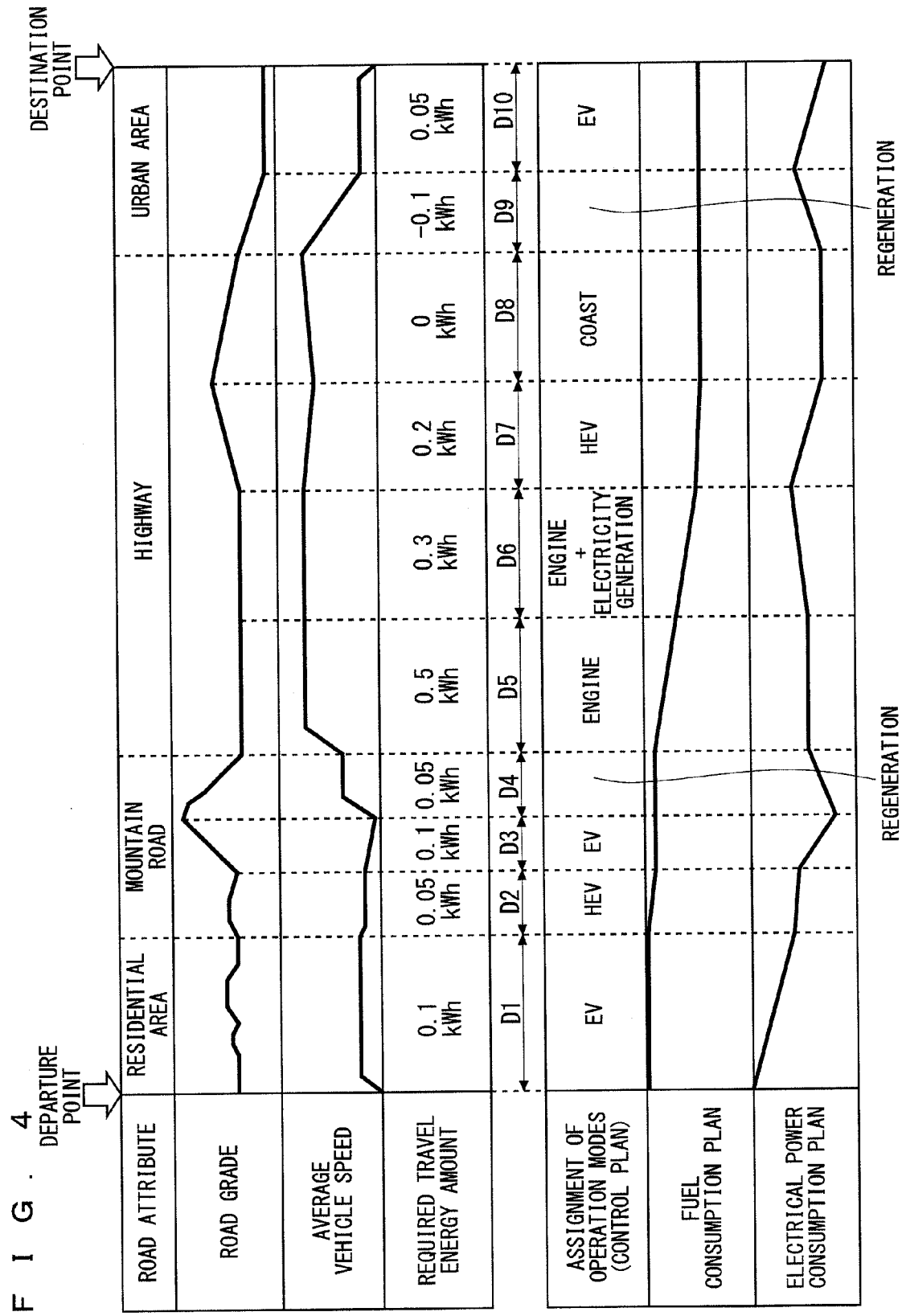

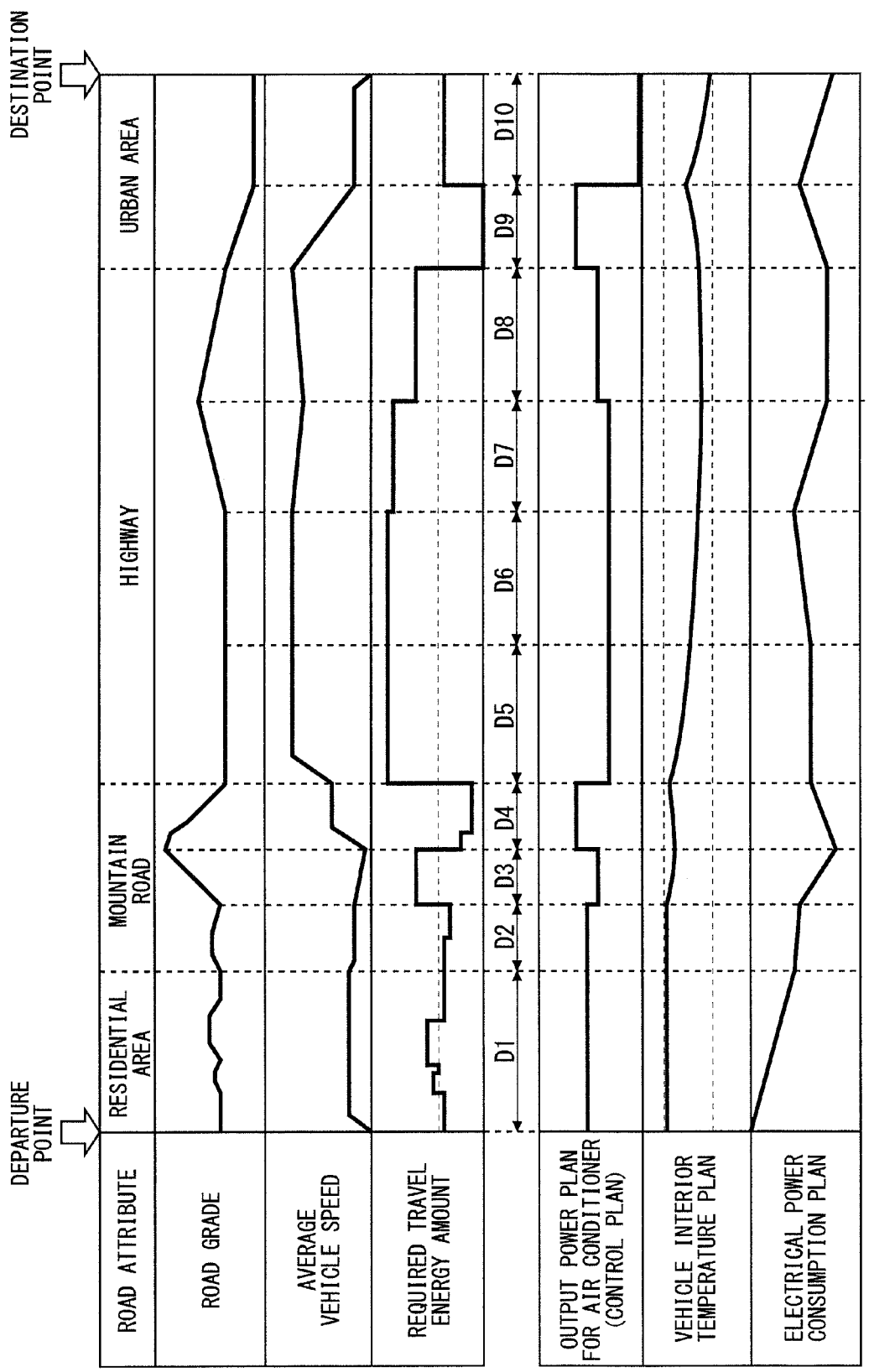

ENERGY MANAGEMENT DEVICE FOR A VEHICLE HAVING A PLURALITY OF DIFFERENT ENERGY SOURCES

BACKGROUND OF THE INVENTION

Field of the Invention

The present invention relates to a vehicle energy management device for managing energy consumption of a vehicle, and more particularly, to a vehicle energy management device suitable for a vehicle having a plurality of different energy sources.

Description of the Background Art

A vehicle that utilizes a plurality of different energy sources such as fuel energy and electrical energy, i.e., a so-called hybrid vehicle, has various operation modes in order to reduce an energy consumption amount. Examples of operation modes of a hybrid vehicle include, for example, a mode in which only power output from the engine is used as the power source to travel, a mode in which only power output from the motor is used as the power source to travel, a mode in which power output from both the engine and the motor is used as the power source to travel, and a mode in which engine output power is used to generate electricity, which is then stored or is used to drive the motor.

Switching control among these operation modes has conventionally been performed based on a current vehicle status determined from information obtained by an in-vehicle sensor (sensor information). That is, operation modes are switched over so that the energy consumption will be minimized, using sequential control in which the output power required for vehicle travel is calculated based on sensor information, and an optimum operation mode for obtaining the output power is then selected.

For example, Japanese Patent No. 3537810 discloses a technique in which a fuel consumption amount required for traveling by the engine, a fuel consumption amount required for traveling by the motor, and a fuel consumption amount required for traveling with the assistance of the motor (i.e., traveling that uses both engine output power and motor output power as the power source) are calculated and compared to select the power source that is substantially low in fuel consumption amount.

Japanese Patent No. 3894105 discloses a technique in which, when additional torque is generated in addition to base torque in order to obtain a required driving force, a comparison is made between the energy efficiency of the engine and the energy efficiency of the motor-generator during generation of the additional torque, and based on the comparison result, a torque generation ratio of the additional torque between the engine and the motor-generator is determined. Thus, this technique provides torque assist control of high energy efficiency.

Japanese Patent No. 3386044 discloses a technique of engine control, in which when a vehicle uses an idling stop function (automatic engine shutdown during stopping), it is determined whether air conditioning capability is available or not, and the engine is not started if such capability is available, and the engine is started if such capability is no more available, and once the engine is started, the engine is not stopped even if air conditioning capability becomes available. This technique can prevent a decrease in fuel mileage, and prevent discomfort from being caused by repetitive start-stop cycles of the engine.

A hybrid vehicle has a drawback in that motor drive using electrical energy, and electrical power regeneration by a regenerative brake during deceleration (electricity generation using kinetic energy of the vehicle), may be limited by the charge status of the storage battery on the vehicle. For example, when the charge level of the storage battery is low, the vehicle needs to travel only by the engine without driving the motor even if a high driving force is required on a rising grade, and thus the fuel mileage is decreased. Conversely, when the charge level of the storage battery is near an upper limit, regenerated electrical power cannot be charged to the storage battery, and therefore the regenerative brake cannot be used even if regeneration can be performed on a downgrade. This necessitates use of a friction brake, which will waste kinetic energy as heat.

When traveling a route including both an urban road and a highway, it is considered that high energy efficiency is achieved by traveling with the motor in the urban area, and traveling with the engine on the highway. Thus, it is preferred that, near the exit of highway, the operation mode be changed to a mode in which the charge level of the storage battery is made high such as, for example, an operation mode in which electricity is generated using engine output power. However, with the conventional method in which the operation mode is selected based on current sensor information, the timing to start electricity generation using engine output power cannot be determined. Thus, the operation mode switching control as described above cannot be performed.

SUMMARY OF THE INVENTION

It is an object of the present invention to provide a vehicle energy management device capable of controlling vehicle devices with good energy efficiency.

An energy management device according to the present invention is used in a vehicle including a plurality of vehicle devices driven by different energy sources. The vehicle energy management device includes a travel route calculator, an energy consumption-related information obtaining unit, an energy consumption amount computing unit, a control plan preparing unit, a vehicle device control unit, and a feedback control unit, as described below. The travel route calculator calculates a travel route of the vehicle. The energy consumption-related information obtaining unit obtains energy consumption-related information which is information related to energy consumption of the vehicle along the travel route. The energy consumption amount computing unit calculates, based on the energy consumption-related information, an estimated value of an energy consumption amount by the plurality of vehicle devices when the vehicle travels along the travel route. The control plan preparing unit prepares a control plan for the plurality of vehicle devices based on the estimated value of the energy consumption amount by the plurality of vehicle devices. The vehicle device control unit controls the plurality of vehicle devices according to the control plan. The feedback control unit performs feedback control of the plurality of vehicle devices so as to reduce a difference between the estimated value and an actual measured value of the energy consumption amount by the plurality of vehicle devices.

The energy management device according to the present invention obtains in advance energy consumption-related information along a travel route, and calculates, based on the information, an estimated value of the energy consumption amount by a plurality of vehicle devices when the vehicle travels along the travel route. This allows both a change in the remaining amount of the fuel and a change in the charge level of the storage battery over the entire travel route to be grasped in advance, and thus control of vehicle devices which has conventionally been impossible can be performed.

For example, in a vehicle using both the engine and the motor as the power source, a control plan for vehicle devices can be prepared so that motor drive using electrical energy and electrical power regeneration by a regenerative brake during deceleration are not limited by the charge status of the storage battery. This can prevent a decrease in fuel mileage due to driving the engine more than necessary, and prevent kinetic energy from being wasted by a friction brake as heat.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a configuration of a control plan preparing unit;

FIG. 4 is a diagram showing an example of a control plan for vehicle devices created by the vehicle energy management device according to the first preferred embodiment; and FIG. 5 is a diagram showing an example of the control plan for the vehicle devices (control plan for an air conditioner) created by a vehicle energy management device according to a second preferred embodiment.

DESCRIPTION OF THE PREFERRED EMBODIMENTS

<First Preferred Embodiment>

Figure 1:
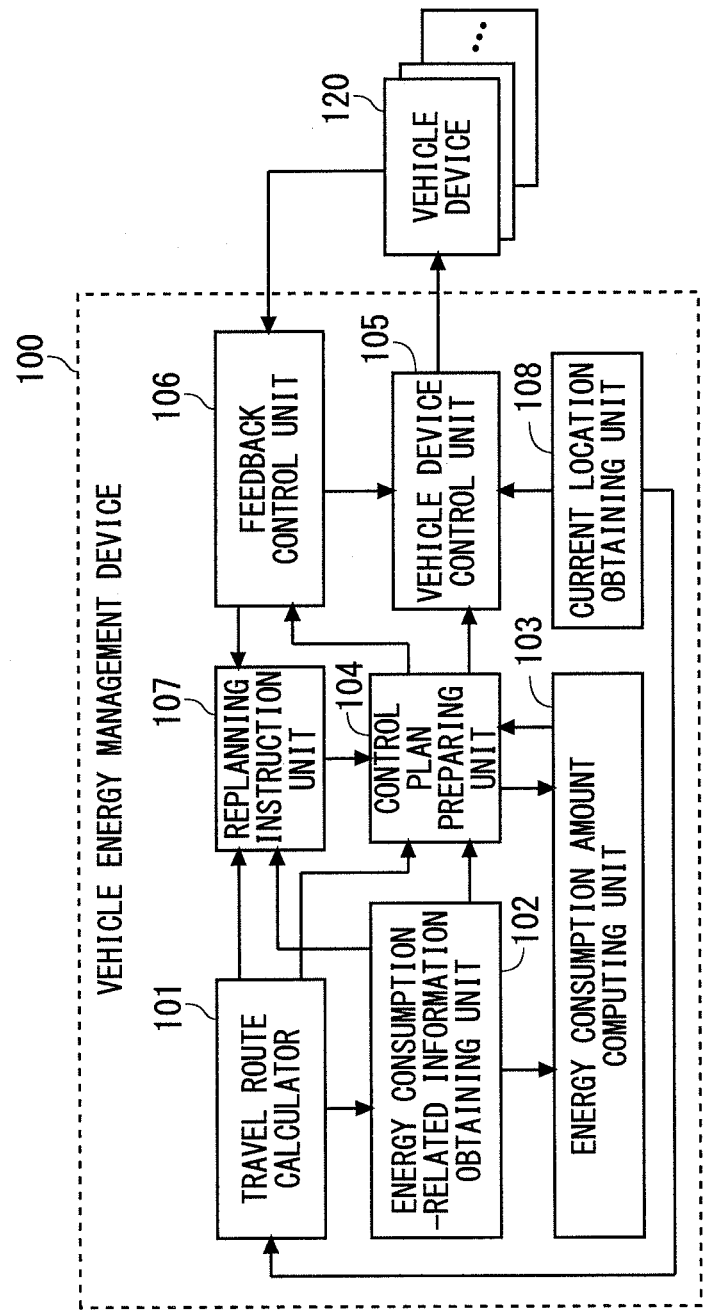
FIG. 1 is a block diagram showing a configuration of a vehicle energy management device according to a first preferred embodiment.

FIG. 1 is a block diagram showing a configuration of a vehicle energy management device according to a first preferred embodiment. The vehicle energy management device according to the present invention can be widely applied to vehicles having two or more energy sources. However, this preferred embodiment is described in terms of a vehicle energy management device installed in a vehicle that utilizes two types of energy, i.e., fuel energy and electrical energy, as the power source.

A vehicle energy management device 100 controls vehicle devices 120, such as a motor, an engine, a generator, and the like, of a vehicle (hereinafter also referred to as "own vehicle") mounted with the vehicle energy management device 100. Note that, when the vehicle reduces its speed, a motor can act as a generator (regenerative brake) that regenerates electrical power. The vehicle devices 120, which are controlled by the vehicle energy management device 100, may include an air conditioner or other devices that do not directly affect the operation mode of the vehicle but have an effect on energy consumption of the vehicle.

As shown in FIG. 1, the vehicle energy management device 100 includes a travel route calculator 101, an energy consumption-related information obtaining unit 102, an energy consumption amount computing unit 103, a control plan preparing unit 104, a vehicle device control unit 105, a feedback control unit 106, a replanning instruction unit 107, and a current location obtaining unit 108. The vehicle energy management device 100 is configured using a computer, and the components described above are implemented by the computer operating according to a program.

The travel route calculator 101 calculates a travel route from a departure point to a destination point (arrival point) of the own vehicle using map data. In addition to the travel route, the travel route calculator 101 can also calculate a departure time at the departure point and an estimated arrival time at the destination point. Here, information on the travel route of the own vehicle, which is output by the travel route calculator 101, includes information such as altitude information (i.e., road grade information), a road attribute (e.g., a type of road, such as urban road, mountain road, highway, and the like), road width, curvature of curves, and speed information indicating a time-dependent traffic flow that is predicted for each road (estimated speed information) of each road included in the travel route. Instead of calculating the travel route, the departure time, the estimated arrival time, and the like of the own device by itself, the travel route calculator 101 may obtain such information from an external navigation device that calculates such information.

The energy consumption-related information obtaining unit 102 obtains information related to energy consumption (energy consumption-related information) of the vehicle along the travel route calculated by the travel route calculator 101. The energy consumption-related information is information that may have an effect on an energy consumption amount of the vehicle, such as, for example, road grade information, a road attribute, road width, curvature of curves, and estimated speed information of each road included in the travel route, traffic congestion information and vehicle speed information indicating an actual traffic flow in each road (actual measured speed information) which are distributed by an information distribution service such as VICS (Vehicle Information and Communication System) (registered trademark), and radar information obtained by an advanced driving support system (e.g., anti-collision safety device) called ADAS (Advanced Driver Assistance System). Conventionally, such information has not been used for the purpose of operation mode switching control of a vehicle. However, this preferred embodiment utilizes such information for operation mode switching control of a vehicle.

Based on the travel route of the own vehicle calculated by the travel route calculator 101 and the energy consumption-related information obtained by the energy consumption-related information obtaining unit 102, the energy consumption amount computing unit 103 calculates an estimated value of the energy consumption amount when the own vehicle travels from a departure point to a destination point, that is, an amount of energy required for the own vehicle to travel through the travel route (required travel energy amount). The required travel energy amount can be calculated using a predetermined equation and characteristic data. Examples of such an equation include a physical equation for calculating a required travel energy amount from the road grade information and estimated speed information of each road included in the travel route, and from vehicle specification information (vehicle weight, running resistance coefficient, and the like), a conversion equation for converting a required travel energy amount into the amount of fuel required to drive the engine, into the amount of electricity required to drive the motor, or into the amount of fuel and the amount of electricity required when both the engine and the motor are used. Examples of the characteristic data include a data map showing characteristics such as torque, engine output power, a fuel consumption amount with respect to the rotation speed of the engine.

Prior to and during the travel of the own vehicle, the control plan preparing unit 104 prepares a control plan for the vehicle devices 120, such as the motor, the engine, and the generator, so that the energy consumption amount (fuel consumption amount and electrical power consumption amount) of the own vehicle over the entire travel route satisfies a predetermined condition (e.g., a condition in which a particular target value is most closely approached, a condition in which the fuel consumption amount is minimized, and the like).

The control plan preparing unit 104 will now be described in more detail. FIG. 2 is a block diagram showing a configuration of the control plan preparing unit 104. As shown in FIG. 2, the control plan preparing unit 104 includes a travel route divider 201 and an operation mode assigning unit 202.

The travel route divider 201 divides the travel route calculated by the travel route calculator 101 into a plurality of sections based on the energy consumption-related information on the travel route. The operation mode assigning unit 202 assigns an operation mode of the own vehicle to each of the sections so that the energy consumption amount of the own vehicle over the entire travel route satisfies a predetermined condition.

Since the energy consumption amount of the vehicle varies depending on the operation mode, the operation mode assigning unit 202 calculates the amount of energy required for traveling through each section (required travel energy amount of each section) for each operation mode by means of the energy consumption amount computing unit 103, and then selects a combination of operation modes of the respective sections so that the energy consumption amount of the own vehicle over the entire travel route satisfies a predetermined condition. This assignment data of operation modes of the respective sections determined by the operation mode assigning unit 202 is output from the control plan preparing unit 104 as the control plan for the vehicle devices 120.

Returning to FIG. 1, the vehicle device control unit 105 controls the vehicle devices 120 according to the control plan for the vehicle devices 120 (assignment data of operation modes of the respective sections) output by the control plan preparing unit 104, to thereby perform switching between operation modes. Note that the operation modes are usually switched over when the own vehicle enters a new section as described later, however, there may be cases where the control plan for the vehicle devices 120 is changed (replanned) during traveling, or where an operation mode cannot be maintained as specified in the control plan due to a driver's operation. In such cases, the operation mode is switched over to another operation mode even in the middle of a section.

The feedback control unit 106 makes a comparison between an actual energy consumption amount (actual measured value of energy consumption amount) of the vehicle devices 120 controlled by the vehicle device control unit 105, and an energy consumption amount in each of the sections that is calculated when the control plan preparing unit 104 creates the control plan (estimated value (planned value) of energy consumption amount), and then corrects operation mode parameters (e.g., an output power ratio between the engine and the motor, the intensity of electrical power regeneration, and the like) so as to reduce the difference between both values.

The replanning instruction unit 107 instructs the control plan preparing unit 104 to re-prepare the control plan for the vehicle devices 120 when the magnitude of the difference or the variation amount of the difference between the estimated value and the actual measured value of the energy consumption amount exceeds a predetermined threshold, or when the own vehicle deviates from the planned travel route (travel route calculated by the travel route calculator 101) and the travel route calculator 101 changes the travel route, for example. The replanning instruction unit 107 can also instruct the control plan preparing unit 104 to re-prepare the control plan when a user instructs to change the control plan for the vehicle devices 120.

The current location obtaining unit 108 calculates the current location of the own vehicle from an absolute location (latitude and longitude) of the own vehicle obtained from a GPS (Global Positioning System), and from a relative location determined from information obtained by a speed sensor and an orientation sensor (sensor information) of the own vehicle. The current location of the own vehicle calculated by the current location obtaining unit 108 is used, for example, in a process in which the travel route calculator 101 calculates a travel route, and in a process in which the vehicle device control unit 105 determines which section the own vehicle travels.

Figure 3:
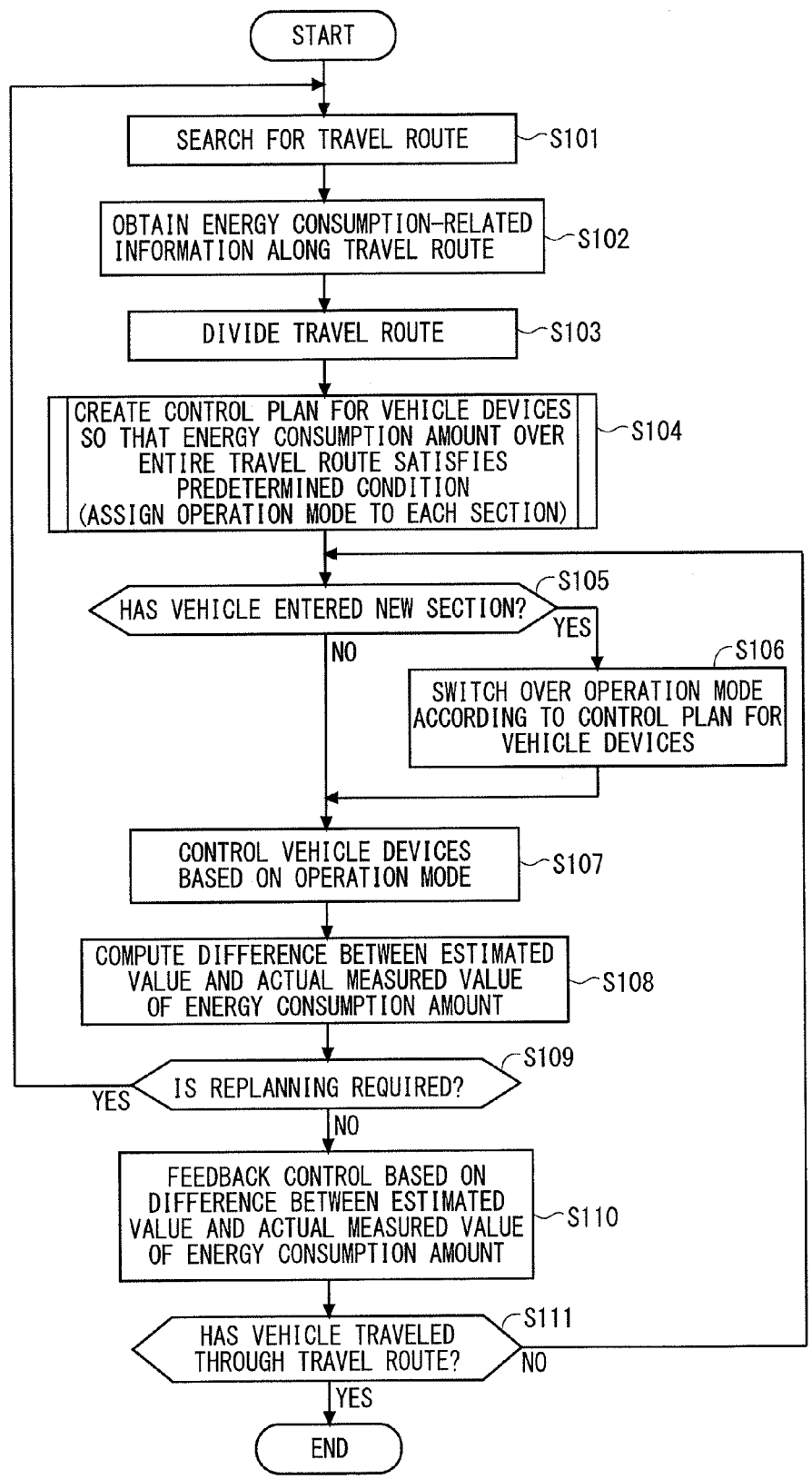
FIG. 3 is a flowchart showing an operation of the vehicle energy management device according to the first preferred embodiment.

Next, an operation of the vehicle energy management device 100 will be described. FIG. 3 is a flowchart showing the operation of the vehicle energy management device 100. FIG. 4 is a diagram showing an example of the control plan which is created for the vehicle device 120 and created by the control plan preparing unit 104.

When the operation flow of the vehicle energy management device 100 starts by starting the vehicle (or by starting an in-vehicle system), the travel route calculator 101 firstly searches for a travel route from the current location to the set destination point (step S101). The destination point may be set by a user of the vehicle using a user interface, or may be automatically set by the travel route calculator 101 by estimating the destination point from a past travel history or the like.

After the search for the travel route is completed, the energy consumption-related information obtaining unit 102 obtains energy consumption-related information on the travel route (step S102). The road attribute (type of road), the road grade, and the average vehicle speed shown in FIG. 4 are extracted from the energy consumption-related information. Note that the average vehicle speed in FIG. 4 is an estimated average speed of the own vehicle, and may be the estimated speed information included in the information on the travel route output from the travel route calculator 101, or actual measured speed information obtained from an information distribution service.

Subsequently, the travel route divider 201 in the control plan preparing unit 104 divides the travel route of the own vehicle into a plurality of sections taking into consideration information such as the road attribute, the road grade, and the average vehicle speed (step S103). The method of dividing the travel route may be such that, for example, the travel route is first divided into broadly-classified sections based on the type of road, and then the sections having a large road grade may be extracted, or the sections having a predefined distance or more may be further divided into a plurality of sections. The travel route shown in FIG. 4 is divided into ten sections D1 to D10. Note that the method of dividing the travel route is not limited to the method described above, but for example, a travel route may be divided into sections so that each of the sections has a predefined distance or a distance that the own vehicle travels in a predefined time period, or may be divided at branching points on a road.

After the dividing of the travel route is completed, the operation mode assigning unit 202 assigns an operation mode to each of the sections so that the energy consumption amount of the own vehicle over the entire travel route satisfies a predetermined condition, to thereby create a control plan for the vehicle devices 120 (step S104).

The creation process of the control plan for the vehicle devices 120 performed in step S104 (assignment process of operation modes of the respective sections) will now be described in detail. First, the operation mode assigning unit 202 calculates the required travel energy amount for each of the sections based on energy consumption-related information such as the road grade and the average vehicle speed, and on vehicle specification information (specification such as dimension and weight) using Equations 1 to 5 shown below.

[Equation 1]
$$F_{Grad} = mg\sin\theta \quad \text{(Equation 1)}$$

[Equation 2]
$$F_{Roll} = mgC_{Roll}\cos\theta \quad \text{(Equation 2)}$$

[Equation 3]
$$F_{Air} = \frac{1}{2}\rho C_{CD} C_{FA} v^2 \quad \text{(Equation 3)}$$

[Equation 4]
$$F_{Acc} = m\frac{d}{dt}v \quad \text{(Equation 4)}$$

[Equation 5]
$$\frac{d}{dt}E = v \times (F_{Grad} + F_{Roll} + F_{Air} + F_{Acc}) \quad \text{(Equation 5)}$$

Equation 1 is used to calculate force $F_{Grad}$ that a road grade (slope angle $\theta$) applies to the vehicle, where m is the weight of the vehicle, and g is the acceleration of gravity. Equation 2 is used to calculate force $F_{Roll}$ that rolling resistance of the tires applies to the vehicle, where $C_{Roll}$ is the rolling resistance coefficient of the tires. Equation 3 is used to calculate force $F_{Air}$ that air resistance applies to the vehicle, where $\rho$ is the density of air, $C_{CD}$ is the air resistance coefficient, $C_{FA}$ is the frontal projected area of the vehicle, and v is the vehicle speed. Equation 4 is used to calculate force $F_{Acc}$ that acceleration resistance applies to the vehicle. Equation 5 is used to calculate energy E per unit time. The required travel energy amounts of the respective sections shown in FIG. 4 are required travel energy amounts calculated for the respective sections using Equations 1 to 5, expressed in units of kilowatt-hours (kWh).

The operation mode assigning unit 202 then determines which operation mode to use to travel in each of the sections, that is, which of the plurality of energy sources of the own vehicle is to be reserved for the required travel energy amount of each of the sections. The assignment of operation modes to the respective sections shown in FIG. 4 shows a result of assignment performed by the operation mode assigning unit 202.

The first preferred embodiment assumes six operation modes for the own vehicle: "EV (Electric Vehicle) mode" to travel by motor drive using stored electrical power; "engine mode" to travel only by the engine using fuel as the energy source; "HEV (Hybrid Electric Vehicle) mode" to travel by both the motor and the engine; "engine plus electricity generation mode," in which electricity generated by rotating the generator by the engine is stored; "regeneration mode," in which electricity is generated using kinetic energy on a downgrade and during deceleration; and "coast mode" to travel by inertia.

In the "EV mode," all the required travel energy amount is supplied by electrical power, and thus no fuel is consumed. The electrical power consumption amount can be calculated by dividing the required travel energy amount by the efficiency of the motor or the inverter. The efficiency of the motor or the inverter may be obtained from a physical equation or from a data map.

In the "engine mode," all the required travel energy amount is supplied by fuel, and thus no electrical power is consumed. The fuel consumption amount can be calculated using a fuel consumption rate map referred to as BSFC (Brake Specific Fuel Consumption) which shows a relationship between, for example, the torque, the rotation speed, and the output power of the engine and the fuel consumption amount.

In the "HEV mode," the required travel energy amount is supplied by a combination of electrical power and fuel. For example, the output power of the engine is set to a value that the torque and the rotation speed of the engine achieve the highest efficiency according to the BSFC, and the output power of the motor is set so as to supply the amount of energy that overcomes the shortage caused by using only the output power of the engine. In this case, the fuel consumption amount can be calculated, using the BSFC, from the torque, the rotation speed, and the output power of the engine set as described above. The electrical power consumption amount can be obtained by subtracting the amount of energy output by the engine from the required travel energy amount, and then dividing the resultant value by the efficiency of the motor or the inverter.

In the "engine plus electricity generation mode," the output power of the engine is set to a value that the torque and the rotation speed achieve the highest efficiency, and in addition, electricity is generated by excess engine output power. Thus, the fuel consumption amount can be calculated, using the BSFC, from the torque, the rotation speed, and the output power of the engine set as described above. The electrical power consumption amount can be obtained by multiplying a negative value corresponding to the amount of electrical power that can be generated by excess engine output power, by the efficiency of the generator or the inverter.

In the "regeneration mode," neither the engine nor the motor generates output power, and only electrical power regeneration is performed. Thus, no fuel is consumed, and an electrical power consumption amount can be obtained as a negative value corresponding to the amount of electrical power generated by the regenerative brake using the motor. Note that the amount of electrical power generated by the regenerative brake can be calculated in the same manner as that of the "EV mode" except that the positive/negative polarity of the value and whether to multiply or divide by the efficiency are opposite.

In the "coast mode," neither the engine nor the motor generates output power, and no electrical power regeneration is performed. Thus, neither electrical power nor fuel is consumed.

The operation mode assigning unit 202 determines the assignment of operation modes to the respective sections so that the fuel consumption amount and the electrical power consumption amount of the own vehicle over the entire travel route satisfies a predetermined condition. However, it is required that any restriction in each characteristic and operation mode of the vehicle (e.g., the capacities of fuel tank and of storage battery, rating values, speed range possible in each operation mode, and the like) be satisfied, and therefore there may be a case in which a specific operation mode cannot be assigned to a certain section. Assignment of operation modes is performed so that a predetermined condition is satisfied while satisfying such a restriction.

A method of determining the assignment of operation modes may be such that operation modes assignable to each of the sections are compared using a brute force method of trying every combination, or using a generally well-known method for solving a so-called "combination optimization problem". Assignment of operation modes of the respective sections determined as described above becomes a control plan for the vehicle devices 120.

FIG. 4 shows, in the form of graphs, an energy consumption plan calculated based on the operation modes of the respective sections, that is, a fuel consumption plan (change in the remaining amount of the fuel) obtained from an estimated value of the fuel consumption amount, and an electrical power consumption plan (change in the charge level of the storage battery) obtained from an estimated value of the electrical power consumption amount. In this way, this preferred embodiment obtains in advance energy consumption-related information along the travel route, and therefore both a change in the remaining amount of the fuel and a change in the charge level of the storage battery over the entire travel route can be grasped in advance.

Thus, when the control plan preparing unit 104 prepares a control plan for the vehicle devices 120, an operation mode can be assigned to each of the sections so that motor drive using electrical energy and electrical power regeneration by the regenerative brake during deceleration is not limited by the charge status of the storage battery of the own vehicle. Preparing such a control plan prevents a decrease in fuel mileage due to driving the engine more than necessary, and kinetic energy from being wasted by the friction brake as heat.

Returning to FIG. 3, when the own vehicle starts traveling, the vehicle device control unit 105 recognizes which section the own vehicle is traveling along the travel route based on the current location of the own vehicle obtained by the current location obtaining unit 108, and determines whether or not the own vehicle has entered a new section (has passed a boundary between sections) (step S105). If the own vehicle has entered a new section (YES in step S105), the operation mode of the own vehicle is switched over as necessary according to the control plan for the vehicle devices 120 (step S106). If the own vehicle has not entered a new section (NO in step S105), the current operation mode is maintained. Then, the vehicle device control unit 105 controls the vehicle devices 120 according to the current operation mode (step S107).

In this regard, during traveling of the own vehicle, a difference may occur between the energy consumption plan (estimated value of energy consumption amount) calculated in step S104 and the actual energy consumption (actual measured value of energy consumption amount). This is because, for example, there may be cases where the vehicle is prevented from traveling at a planned speed by unexpected traffic congestion, or where an operation mode is not maintained as specified in the control plan due to a driver's operation. Even in a section in the "coast mode" or in the "regeneration mode," which assumes that neither the engine nor the motor produces output power, it is well conceivable that the driver may operate the accelerator pedal or brake pedal of the own vehicle depending on the actual traffic condition. Such a difference may also occur when the own vehicle deviates from the planned travel route.

In order to recognize such a deviation from the energy consumption plan, the feedback control unit 106 computes any difference between the estimated value and the actual measured value of the energy consumption amount (step S108). Specifically, for example, a difference between the fuel consumption amount measured by a controller for engine control and the estimated value of the fuel consumption amount calculated in advance (fuel consumption plan of FIG. 4), and a difference between the electrical power consumption amount determined by a controller for motor control and the estimated value of the electrical power consumption amount calculated in advance (electrical power consumption plan of FIG. 4) are computed.

If the magnitude of the difference therebetween or the variation amount of that difference computed by the feedback control unit 106 exceeds a predetermined threshold, if the travel route is changed because the own vehicle has deviated from the travel route, or if a user issues an instruction, the replanning instruction unit 107 determines that the control plan for the vehicle devices 120 needs to be re-prepared (YES in step S109), and instructs the control plan preparing unit 104 on re-preparation thereof. The flow then returns to step S101. Otherwise (NO in step S109), the feedback control unit 106 corrects operation mode parameters (e.g., an output power ratio between the engine and the motor, the intensity of electrical power regeneration, and the like) to reduce the difference between the estimated value and the actual measured value of the energy consumption amount obtained in step S104, thereby performing feedback control of the vehicle devices 120 (step S110).

Thereafter, the vehicle device control unit 105 checks whether the own vehicle has or has not traveled through the travel route (step S111). If the own vehicle has traveled through the travel route (YES in step S111), the flow ends. Otherwise (NO in step S111), the flow returns to step S105.

As described above, the vehicle energy management device 100 according to the first preferred embodiment obtains in advance energy consumption-related information along the travel route, and therefore both a change in the remaining amount of the fuel and a change in the charge level of the storage battery over the entire travel route can be grasped in advance. Accordingly, operation mode switching control which cannot be performed by conventional vehicles can be performed.

For example, when the control plan for the vehicle devices 120 is prepared, an operation mode can be assigned to each of the sections so that motor drive using electrical energy and electrical power regeneration by the regenerative brake during deceleration are not limited by the charge status of the storage battery of the own vehicle. This can prevent a decrease in fuel mileage due to driving the engine more than necessary, and kinetic energy from being wasted by the friction brake as heat.

Specifically, there may be considered operation mode switching control in which electrical power required to ascend a rising grade is charged to the storage battery before the rising grade, thereby suppressing fuel consumption by the engine by motor drive using the charged electrical power when ascending the rising grade, and operation mode switching control in which electrical power is actively consumed by increasing the output power of the motor and the air conditioner before a downgrade, thereby ensuring in advance in the storage battery a sufficient remaining capacity to store regenerated electrical power during descending the downgrade without wasting. There may be also considered operation mode switching control in which the charge level of the storage battery is made high near the exit of a highway, and the motor is driven using the charged electrical power when traveling along an urban road.

Moreover, since information of a ratio between the urban roads and highways along the travel route can be obtained in advance, there can be provided operation mode switching control in which motor drive using electrical power is performed as much as possible on urban roads, and on highways, highly efficient areas are traveled by driving the engine, and the storage battery is charged simultaneously.

Note that the energy consumption-related information that is obtained by the energy consumption-related information obtaining unit 102, and which is considered when preparing the control plan for the vehicle devices 120 may also include, in addition to those described above by way of example, weather information (weather, air temperature, humidity, insolation, and the like), supply and demand information of energy network of the infrastructure (e.g., electric grids in a residence, a factory, a building, and the like), and other information. Supply and demand information of energy network of the infrastructure includes, for example, supply and demand plans of electrical power created by energy management systems (EMSs) of residences, factories, buildings, and the like. Such information does not directly affect the amount of energy (energy consumption amount by the engine and the motor) required for a vehicle to travel, but has an effect on the amount of energy that can be consumed for driving the engine and the motor.

For example, power consumption of devices such as an air conditioner, windshield wipers, and lights may be high depending on the air temperature, the weather, the humidity, and the like along the travel route, which accordingly reduces the amount of electrical power that can be consumed for motor driving. In a section in which such a situation is assumed, an operation mode having a low priority for motor drive may be assigned. Also, for example, when the supply and demand plan of electrical power of the driver's residence or office uses the electrical power stored in the storage battery of the own vehicle, an assignment ratio between engine drive and motor drive can be controlled so that the charge level of the storage battery upon arrival meets the supply and demand plan of electrical power of the driver's residence or office.

<Second Preferred Embodiment>

Energy consumed by the air conditioner (in particular, the electric compressor and the electric heater) accounts for a relatively large portion of the energy that is consumed by a vehicle. Therefore, use of the air conditioner using electrical power significantly reduces the distance that can be traveled using the electrical power of the vehicle. In other words, the air conditioner can be used as means for adjusting the energy consumption amount of the vehicle. Thus, a second preferred embodiment includes a control plan for the air conditioner into the control plan for the vehicle devices 120 of the first preferred embodiment.

The configuration and the operation of the vehicle energy management device 100 according to the second preferred embodiment are similar to those of the first preferred embodiment except for the contents of the control plan for the vehicle devices 120 created by the control plan preparing unit 104. Thus, the description thereof will be omitted.

FIG. 5 shows an example of the control plan which is created for the vehicle devices 120 and created by the control plan preparing unit in the vehicle energy management device according to the second preferred embodiment. FIG. 5 shows the required travel energy amount calculated when creating the control plan for the vehicle devices 120 in terms of variation over time, instead of those amounts in the respective sections. In this case, it is assumed that the air conditioner operates in a heater mode to raise the temperature of the vehicle interior.

In this preferred embodiment, electrical power that is consumed by the air conditioner is assigned to each of the sections, and an output power plan for the air conditioner is created according thereto. Specifically, a threshold (the broken line in the graph of the required travel energy amount in FIG. 5) is imposed on the required travel energy amount, and the plan is created such that the output power of the air conditioner is raised in sections in which the required travel energy amount falls below the threshold, and is reduced in sections in which the required travel energy amount exceeds the threshold. That is, the vehicle interior temperature is adjusted by the air conditioner mainly in sections in which the required travel energy amount is low, while the electrical power consumption by the air conditioner is reduced in sections in which the required travel energy amount is high, so that the stored electrical power in the storage battery can be utilized for motor drive.

However, if the vehicle interior temperature goes far beyond a set temperature, passenger comfort is impaired. Therefore, the output power of the air conditioner is adjusted so that the vehicle interior temperature remains within a predefined range (between the two broken lines in the graph of the vehicle interior temperature plan in FIG. 5) with respect to the set temperature.

In addition, when the own vehicle approaches the destination point (end point of the travel route) (when the distance between the current location and the destination point is equal to or less than a specific value, or the difference between the current time and the estimated arrival time at the destination point is equal to or less than a specific value), unnecessary use of the air conditioner may be prevented by planning to limit the output power of the air conditioner (in FIG. 5, the plan is such that the output power of the air conditioner is made zero when the vehicle enters the section D10, which is a section immediately before the destination point).

Once the control plan for the air conditioner is determined as described above, operation modes can thereafter be assigned to the sections in a similar manner to the first preferred embodiment, taking into consideration the electrical power consumption by the air conditioner based on the control plan for the air conditioner.

With the vehicle energy management device 100 according to the second preferred embodiment, the control plan of the operation mode is prepared after a control plan for the air conditioner is prepared such that, while the vehicle interior is kept comfortable, the energy consumption by the air conditioner is reduced in sections in which the required travel energy amount is high, whereas the energy consumption by the air conditioner is increased in sections in which the required travel energy amount is low. This reduces the possibility that motor drive is limited by electric power consumption by the air conditioner, thereby allowing more efficient operation mode switching control than that of the first preferred embodiment to be performed.

While the invention has been shown and described in detail, the foregoing description is in all aspects illustrative and not restrictive. It is therefore understood that numerous modifications and variations can be devised without departing from the scope of the invention.

What is claimed is:

1. A vehicle energy management device used in a vehicle including a plurality of vehicle devices driven by different energy sources, the vehicle energy management device comprising:
a travel route calculator configured to calculate a travel route of the vehicle;
an energy consumption-related information obtainer configured to obtain energy consumption-related information which is information related to energy consumption of the vehicle along the travel route, the energy consumption-related information including a road attribute and a road slope angle;
an energy consumption amount computer configured to calculate an estimated value of an energy consumption amount per unit time, by the plurality of vehicle devices when the vehicle travels along the travel route, based on a first force applied to the vehicle due to the road slop angle, a second force applied to the vehicle due to rolling resistance of tires of the vehicle, a third force applied to the vehicle due to air resistance, and a fourth force applied to the vehicle due to acceleration resistance;
a control plan preparer configured to divide the travel route into a plurality of sections based on the road attribute, the road slope angle, and the estimated value of the energy consumption amount per unit time, and prepare a control plan for the plurality of vehicle devices based on the estimated value of the energy consumption amount per unit time;
a vehicle device controller configured to control at least a motor and an engine included in the plurality of vehicle devices to drive the vehicle by using at least one of the different energy sources which is selected according to the control plan; and
a feedback controller configured to perform feedback control of the plurality of vehicle devices to reduce a difference between the estimated value and an actual measured value of the energy consumption amount by the plurality of vehicle devices,
wherein the vehicle energy management device comprises at least one hardware computing device configured to implement the travel route calculator, the energy consumption-related information obtainer, the energy consumption amount computer, the control plan preparer, the vehicle device controller, and the feedback controller, and
wherein the control plan preparer switches an operation mode of the vehicle back and forth at least among an electric vehicle mode, an engine mode, a hybrid electric vehicle mode, based on the estimated value of the energy consumption amount per unit time that is calculated using the first to fourth forces.

2. The vehicle energy management device according to claim 1, wherein
the energy consumption-related information further includes at least one of a road width, a road curve, estimated speed information, and actual measured speed information of each road included in the travel route, and the actual measured speed information corresponding to actual measured traffic flow.

3. The vehicle energy management device according to claim 1, wherein
the energy consumption-related information includes weather information.

4. The vehicle energy management device according to claim 1, wherein
the energy consumption-related information includes supply and demand information of an energy network of an infrastructure and the control plan preparer selects at least one of the different energy sources based on the supply and demand information.

5. The vehicle energy management device according to claim 1, wherein
the control plan preparer re-prepares the control plan when a magnitude of a difference or a variation amount of a difference between the estimated value and the actual measured value of the energy consumption amount by the plurality of vehicle devices exceeds a predetermined threshold.

6. The vehicle energy management device according to claim 1, wherein
the control plan preparer re-prepares the control plan when the vehicle deviates from the travel route or when the travel route is changed.

7. The vehicle energy management device according to claim 1, wherein
the control plan preparer re-prepares the control plan in response to an instruction from a user.

8. The vehicle energy management device according to claim 1, wherein
a plurality of operation modes each of which utilizes at least one of said plurality of vehicle devices are defined,
the vehicle device controller switches vehicle devices to be used when the vehicle travels by switching the operation modes of the vehicle,
the control plan preparer includes
a travel route divider configured to divide the travel route into the plurality of sections based on the road attribute, the road slope angle, and the estimated value of the energy consumption amount per unit time, and
an operation mode assigner configured to assign any of the plurality of operation modes to each of the sections,
the energy consumption amount computer calculates the estimated value of the energy consumption amount for each of the sections when the vehicle travels in each operation mode, and
the operation mode assigner determines the operation mode assigned to each of the sections based on the estimated value of the energy consumption amount for each of the sections so that the energy consumption amount over the entire travel route satisfies a predetermined condition.

9. The vehicle energy management device according to claim 8, wherein
the travel route divider is further configured to device the travel route into the plurality of sections based on at least one of a road width, a road curve, estimated speed information, and actual measured speed information of each road, the actual measured speed information corresponding to actual measured traffic flow.

10. The vehicle energy management device according to claim 8, wherein
the travel route divider divides the travel route into the plurality of sections such that each of the plurality of sections has a predefined distance or a distance that the vehicle travels in a predefined time period.

11. The vehicle energy management device according to claim 8, wherein
the travel route divider divides the travel route into the plurality of sections at branching points on a road.

12. The vehicle energy management device according to claim 1, wherein
the plurality of vehicle devices include the engine that uses fuel as an energy source, the motor that uses electrical power as an energy source, and a generator that generates electricity using an output of the engine or kinetic energy of the vehicle.

13. The vehicle energy management device according to claim 1, wherein
the plurality of vehicle devices include an air conditioner that uses electrical power as an energy source.

14. The vehicle energy management device according to claim 13, wherein
the control plan preparer prepares a control plan for the air conditioner so that an output power of the air conditioner is reduced when travel by the vehicle requires a relatively large amount of electrical power, and the output power of the air conditioner is raised when travel by the vehicle requires a relatively small amount of electrical power as long as a vehicle interior temperature of the vehicle remains within a specific range.

15. The vehicle energy management device according to claim 13, wherein
the control plan preparer prepares the control plan for the air conditioner such that the output power of the air conditioner is limited when a distance between a current location of the vehicle and an end point of the travel route is equal to or less than a specific value, or a difference between a current time and an estimated arrival time at the end point of the travel route is equal to or less than a specific value.

16. The vehicle energy management device according to claim 1, wherein the different energy sources correspond to energy sources controlled under different operation modes, wherein the different operation modes comprise:
the electric vehicle mode in which the vehicle travels only by the motor using stored electric power;
the engine mode in which the vehicle travels only by the engine using fuel;
the hybrid electric vehicle mode in which the vehicle travels using a combination of the motor and the engine;
an engine plus electricity generation mode in which electricity generated by rotating a generator of the vehicle by the engine is stored;
a regeneration mode in which electricity is generated using kinetic energy without generating output power through the engine or the motor; and
a coast mode in which the vehicle travels by inertia without generating output power though the engine or the motor and without preforming electric power regeneration, and
wherein the control plan preparer switches the operation mode of the vehicle back and forth among the electric vehicle mode, the engine mode, and the hybrid electric vehicle mode, the engine plus electricity generation mode, the regeneration mode, and the cost mode, based on the estimated value of the energy consumption amount per unit time.

* * * * *